(No Model.)

C. H. HARMON.
OVEN ATTACHMENT.

No. 381,470. Patented Apr. 17, 1888.

Witnesses
A. E. Dowell.
F. T. F. Johnson.

Inventor.
Charles H. Harmon.
By his Attorney.
T. M. Alexander

UNITED STATES PATENT OFFICE.

CHARLES H. HARMON, OF LEBANON, OREGON, ASSIGNOR TO HIMSELF AND WILLIAM H. REED, OF SAME PLACE.

OVEN ATTACHMENT.

SPECIFICATION forming part of Letters Patent No. 381,470, dated April 17, 1888.

Application filed November 14, 1887. Serial No. 255,098. (No model.)

*To all whom it may concern:*

Be it known that I, CHARLES H. HARMON, of Lebanon, in the county of Linn and State of Oregon, have invented certain new and useful Improvements in Oven Attachments; and I do hereby declare that the following is a full, clear, and exact description thereof, reference being had to the accompanying drawings, and to the letters of reference marked thereon, which form part of this specification, in which—

Figure 1:
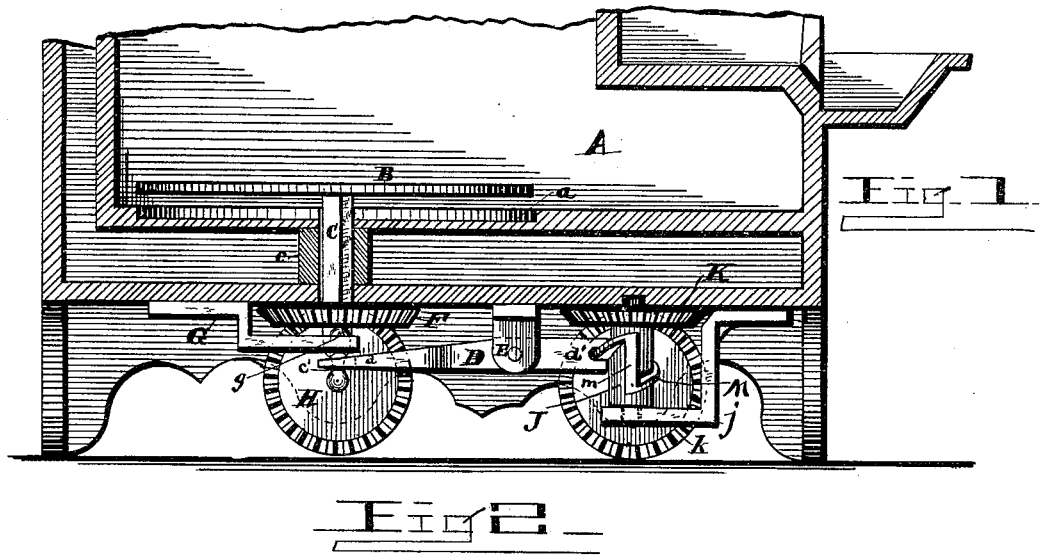
Figure 2:
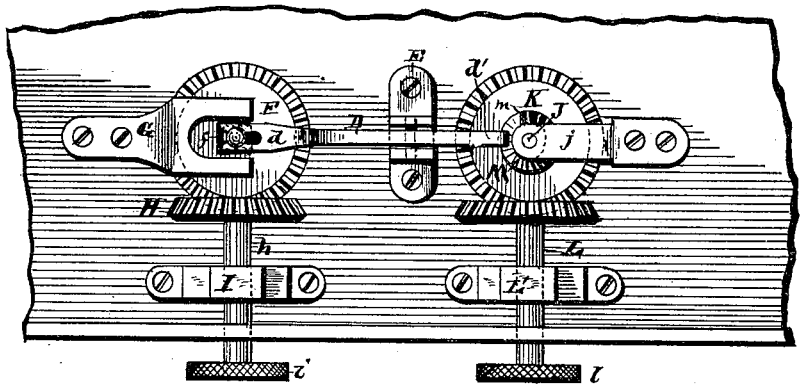
Figure 3:
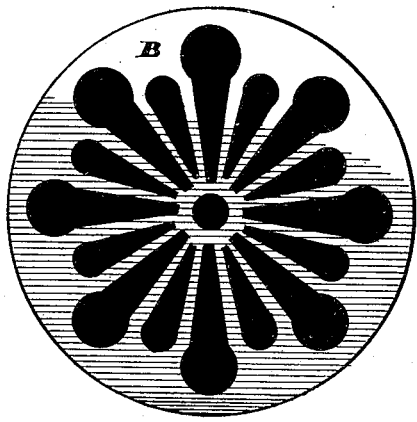

Figure 1 represents a sectional view of the oven of a stove or range, showing my improvement applied thereto. Fig. 2 is a bottom plan view of the same. Fig. 3 is a top plan view of the revolving disk.

This invention relates to improvements in cooking stoves and ranges; and it consists, essentially, in the combination therewith of a movable and revolving disk or support arranged within the oven, and the devices for revolving and elevating or lowering said disk without opening the door of the stove, or without handling the vessel in which food is being cooked after placing the same within the oven, so that the food can be evenly cooked on top, bottom, and sides, whether the oven is equally heated in all parts or not. While movable supports have been employed in ovens of various kinds, they have been clumsy in construction, troublesome in use, and necessitating a special construction of stove to accommodate them. The present invention is designed to obviate these disadvantages, while it is simple and convenient and applicable to nearly, if not quite, all the present known forms of ovens in stoves and ranges.

The invention will be fully understood from the following description, in connection with the accompanying drawings, and is concisely stated in the appended claims.

Referring by letter to the said drawings, A designates the oven of a stove or range, which is provided with the usual exterior heating-flues. At about the center of the bottom of oven A is a disk, B, mounted upon the upper end of a short vertical shaft, C, which passes through the bottom flue and walls of the oven, and is surrounded by a short hollow sleeve, c, that is placed in said bottom flue around shaft C to prevent escape of gases or smoke into the oven. Disk B is preferably circular in plan and is arranged to revolve on axial shaft C within the oven. The disk may also be perforated or radially slotted, in order both to diminish its weight, if made of cast metal, and also to permit the heat rising from the bottom of the oven to more directly strike the vessel on said disk during the process of cooking.

A recess, *a*, corresponding in contour and depth to the disk B, is preferably made in the bottom of oven A, so that when lowered the top surface of the disk will be flush with the floor of the oven.

Shaft C is extended below and outside of the bottom of the oven and is squared on its lower portion, and is supported upon one end of an oscillating lever, D, pivoted on a bracket, E, to one side thereof, as shown. The end *d* of lever D is bifurcated vertically, and this bifurcation embraces a neck, *c'*, formed on the lower end of shaft C, as shown, so that while the shaft can rotate freely on said lever, the latter can be oscillated to elevate or lower shaft C vertically, and thereby similarly affect disk B.

F designates a beveled gear loosely mounted upon the squared end of shaft C by its angular axial opening *f*, as shown, so that it will revolve the shaft with itself, but permits the latter to play vertically through it. Gear F is placed above lever D and is kept from falling upon the latter and off the shaft by means of the bifurcated bayonet-bracket G, secured to the bottom of the stove on the side opposite bracket E, and having its bifurcated arms provided on their ends with upstanding knobs *g*, which engage the lower face of gear F and support the same.

Gear F is engaged by a corresponding gear, H, mounted on a shaft, *h*, journaled in a bracket, I, secured to the bottom of the stove and lying at right angles to lever D and bracket G. The outer end of shaft *h* passes outward from beneath the oven to the side thereof, where it bears a finger-wheel, *i*, by which the shaft can be rotated; or a crank may be substituted for the wheel, if desired.

J designates a short vertical shaft supported by a bayonet-bracket, *j*, secured to the bottom of the stove on the side of bracket E opposite shaft C, and having journals in the arms of said bracket and in the bottom plate of the stove, as shown.

K designates a bevel-gear fixed on the upper end of shaft J and engaged by a gear, k, mounted on the inner end of a shaft, L, similar to and lying parallel with shaft I of gear H, and having bearings in a bracket, L', and provided with finger-wheel l, as shown. Below gear K on shaft J is formed a worm, M, which has a pitch of about thirty degrees, and is about U-shaped in cross-section, so as to engage the horizontally-bifurcated inner end, d', of lever D, as shown. It is obvious that the rotation of worm M on shaft J will raise or depress the engaging end of lever D, and in order to prevent the disengaging of the worm with said lever I form a vertical stop lug or rib, m, on the shaft J at the ends of worm M, as shown.

The operation of the device will be apparent from the foregoing, and in practical use, for instance, if a loaf of bread placed upon disk B is found to be browning too rapidly on one side in consequence of the oven being unequally heated, the operator can at once remedy this by manipulating wheel i, which, through its connections, causes the revolving of the disk, and consequently of the loaf. Again, should the loaf be browning too fast or too slow on the top or bottom, it can be either raised or lowered by manipulating wheel l, as is evident. By reason of the worm M the disk can be stopped and held in any point of its vertical movement, as is obvious. This will be found of great advantage, and by having the fulcrum of lever D nearer the worm M than to shaft C a greater vertical movement can be given to said shaft than is imparted to the end of the lever-engaging worm M, as is evident. By the use of the lever and worm the actuating mechanisms for the disk occupy but little vertical space, permitting the application of the device to ordinary stoves with but little expense.

Having described my invention, I claim—

1. The combination, with a cooking stove or range, of a vertical shaft passing through the bottom of an oven, a disk mounted on the end of said shaft within the oven, the pivoted oscillating lever supporting said shaft at one end, and mechanism for rotating said shaft, the worm-shaft engaging the opposite end of said lever, and the shaft and gearing for actuating said worm-shaft, all substantially as and for the purpose described.

2. The combination, with a cooking stove or range, of the revolving disk, its supporting-shaft squared on its lower end, the bevel-gear loosely mounted on the lower end of said shaft, the bracket for supporting said gear, and the mechanism engaging said gear and rotating the shaft, the pivoted lever bearing said shaft at one end, the worm-shaft engaging the opposite end of said lever to oscillate the same, and the shaft and gearing for actuating said worm, all constructed and arranged substantially in the manner and for the purpose described.

In testimony that I claim the foregoing as my own I affix my signature in presence of two witnesses.

CHARLES H. HARMON.

Witnesses:
 G. W. SMITH,
 ALEX. MEEARL.